Nov. 15, 1927.

C. C. FARMER

COMBINED COCK AND SWITCH

Filed Feb. 13, 1926

1,649,023

INVENTOR
CLYDE C. FARMER
BY Wm. W. Cady
ATTORNEY

Patented Nov. 15, 1927.

1,649,023

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED COCK AND SWITCH.

Application filed February 13, 1926. Serial No. 88,034.

This invention relates to the control of electric train wire circuits, and the principal object of my invention is to provide a combined electric circuit controlling switch and fluid pressure cock, in which the switch is controlled by the movement of the cock.

The purpose of the invention is to avoid the possibility of an operator coming in contact with a charged electric train line when he breaks connections between cars.

Figure 1:
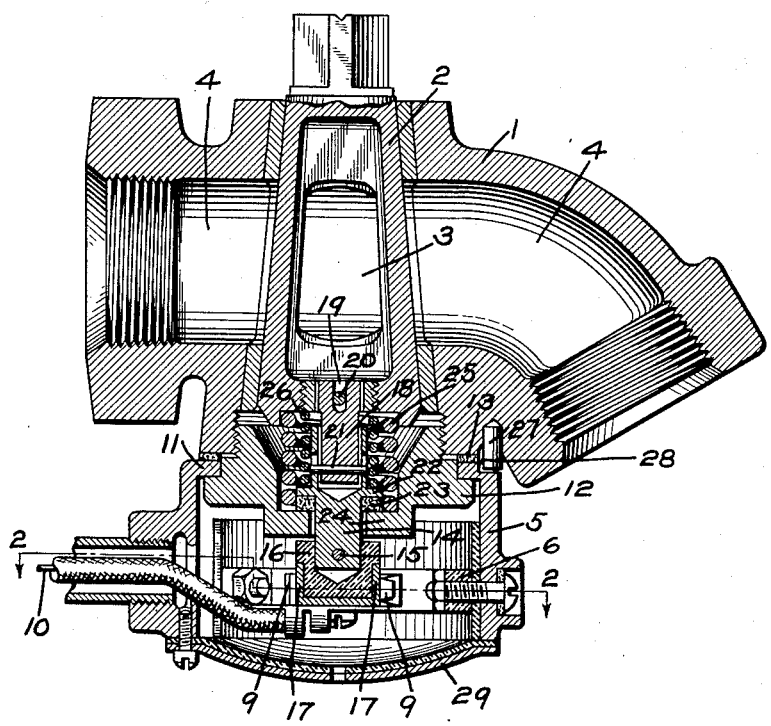
Figure 2:
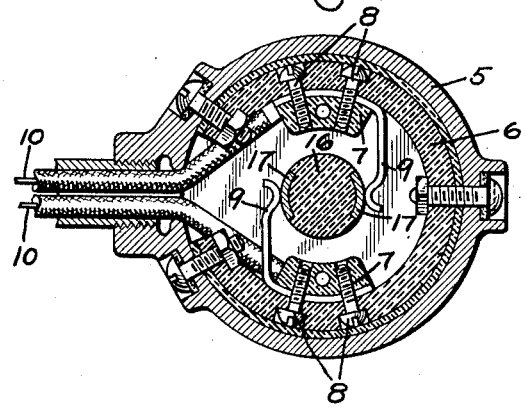

In the accompanying drawing; Fig. 1 is a central sectional view of a combined electric switch and cock and embodying my invention; and Fig. 2 a section on the line 2—2 of Fig. 1.

The construction shown in the drawing includes the well known angle cock which is connected to the brake pipe at each end of the car, and comprises a valve casing 1 containing a plug valve 2 which is adapted to be turned either to open position, in which the opening 3 in the valve registers with the passageway 4, or to the closed position, as shown in the drawing, in which communication through the passageway 4 is cut off.

Applied to the under side of the angle cock is an electric switch device comprising a cylindrical casing 5. Secured within the casing 5 is a ring 6 of insulating material and clamped between said ring and blocks 7 of insulating material, by means of screws 8, are electric contact fingers 9, each having a connection to a circuit wire 10. While not shown in the drawing, it may be stated that the wires 10 are included in the circuit of a suitable relay which controls the operation of a cut-out switch in an electric train line circuit, which it is desired to open when cars are to be separated.

The casing 5 is provided with an inwardly extending annular flange 11 and said flange is clamped to the valve casing 1 by a cap nut 12, a gasket 13 being interposed between the flange 11 and the casing 1 so as to provide a fluid tight joint.

Extending downwardly through a central opening in the cap nut 12 is a stem 14 having secured to the lower end thereof, by means of a pin 15, a cylindrical block 16 of insulating material and carried by said block are connected contact members 17 adapted to be engaged, in one position of the block 16, by the fingers 9.

The stem 14 extends upwardly and is provided at its upper portion with a central bore into which a stem 18 loosely extends. The stem 18 is provided with a transverse slot 19 through which a pin 20 extends, said pin being secured in the lower end of the valve 2.

The stem 18 is provided with a pin 21 which extends into slots provided in the stem 14, so that when the stem 18 is rotated, the stem 14 will also be rotated. The stem 14 is provided at an intermediate point with an annular flange 22 to which is secured a gasket 23 adapted to engage the flange 24 of the cap nut 12, so as to form a fluid tight joint.

Interposed between the lower end of the plug valve 2 and the flange 24 of the cap nut 12 is a coil spring 25 and interposed between the lower end of said valve and the flange 22 is a lighter coil spring 26. The combined pressures exerted by the springs 25 and 26 is such as deemed necessary to hold the plug valve 2 seated with the desired pressure. By employing two springs, a light spring pressure may be applied to the flange 22 of the stem 14, which, while sufficient to maintain the gasket 23 seated against leakage, will not exert such a pressure as to cause excessive resistance to rotative movement and unnecessary wear of the gasket.

The open slot 19 in the stem 18 which receives the pin 20, permits the parts to be easily assembled and the elongated slots in the stem 14 in which the pin 21 plays, permits adjustment of the parts for any inequalities in spacing of the members.

When the plug valve 2 is turned to its closed position, as shown in the drawing, the contact fingers 9 engage the connected contacts 17 and a circuit through the wires 10 is closed. The relay in said circuit is then energized and the relay is operated to effect the opening of a circuit breaker in the train wire, the circuit of which it is desired to open, so as to cut off current flow through the train wire and thus obviate the possibility of an operator coming in contact with a charged train wire.

When the plug valve 2 is turned to its open position, the member 16 is rotated, so that the contacts 17 are rotated out of connection with the contact fingers 9, and thereby the circuit through the wires 10 is broken.

In order to ensure that the switch portion will always be applied in the correct position relative to the angle cock, a downwardly extending pin 27 may be secured in the valve casing 1, which is adapted to register with a cavity 28, provided in the casing 5.

The lower end of the casing 5 is closed by a cover plate 29, which when removed permits access to the interior of the casing 5.

Having now described my invention, what I claim as new and desire to secure by Letters Patent, is:

1. The combination with a valve casing, a plug valve in said casing, and a cap nut secured to said casing and enclosing one end of said valve, of an electric switch having a rotatable member, a stem connected to said member and extending through an opening in said cap nut and having means for making a fluid tight joint at said opening, a stem connected to said valve, and a pin connecting said stems and adapted to permit relative axial movement of said stems.

2. The combination with a valve casing, a plug valve in said casing, and a cap nut secured to said casing and enclosing one end of said valve, of an electric switch having a rotatable member, a stem extending through an opening in said cap nut and connected to said member and having an annular flange provided with a seat for making a fluid tight joint at said opening, a spring interposed between said flange and said valve, and a stem connected to said valve, said stems being operatively connected and the stem having the flange being movable by said spring relatively to the valve.

3. The combination with a valve casing, a plug valve in said casing, and a cap nut secured to said casing and enclosing one end of said valve, of an electric switch having a rotatable member, a stem extending through an opening in said cap nut and connected to said member and having an annular flange, a spring interposed between said flange and said valve, a spring interposed between said cap nut and said valve, and means operatively connecting said valve with said stem.

4. The combination with a valve casing and a plug valve in said casing, of an electric switch having a rotatable member, a stem connected to said member, a stem having a slot, a pin secured to said valve and engaging in said slot, and a pin connecting said stems.

5. The combination with a valve casing and a plug valve in said casing, of an electric switch having a rotatable member, a stem connected to said member, a stem having a slot, a pin secured to said valve and engaging in said slot, and a pin secured to one stem and extending into slots formed in the other stem.

In testimony whereof I have hereunto set my hand.

CLYDE C. FARMER.